Aug. 23, 1966  B. D. SCHWALM  3,268,268
FORAGE HARVESTER
Filed Aug. 10, 1965  2 Sheets-Sheet 1
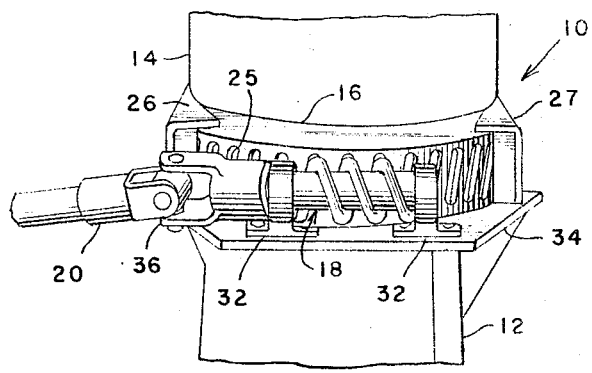
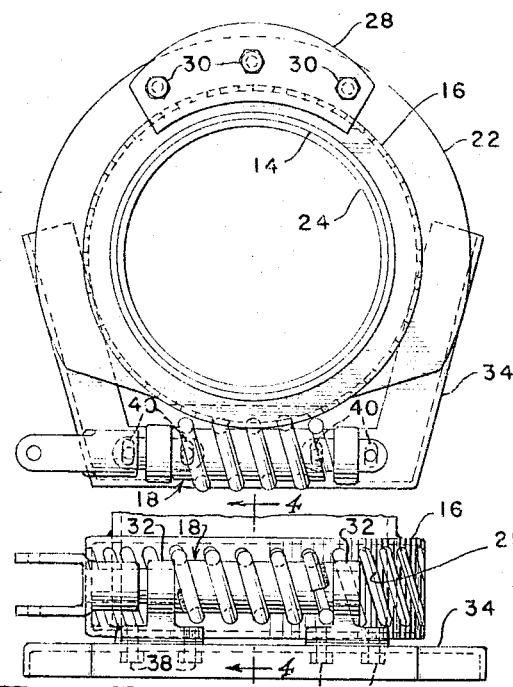
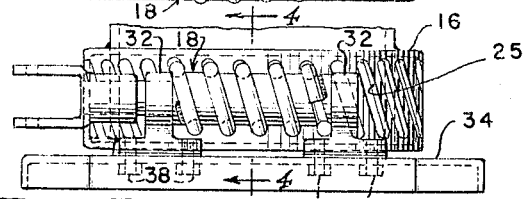
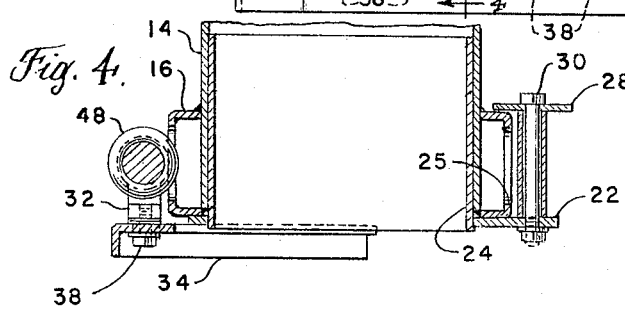
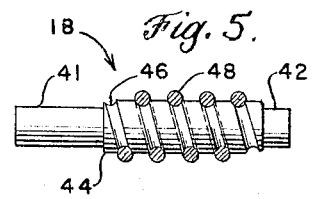
INVENTOR.
BRUCE D. SCHWALM
BY 
ATTORNEY

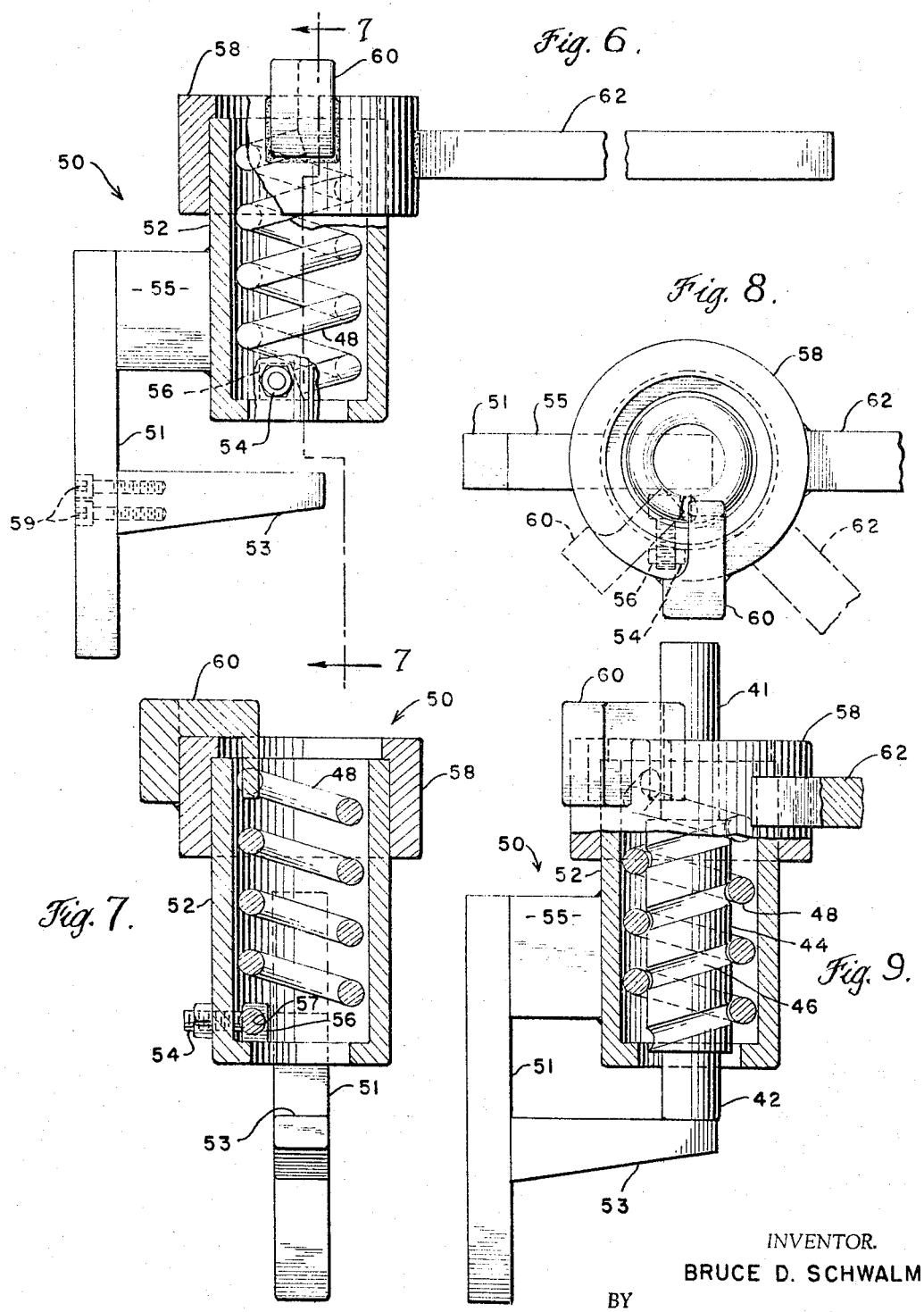

United States Patent Office 3,268,268
Patented August 23, 1966

3,268,268
FORAGE HARVESTER
Bruce D. Schwalm, Leola, Pa., assignor to Sperry Rand Corporation, New Holland, Pa., a corporation of Delaware
Filed Aug. 10, 1965, Ser. No. 478,549
4 Claims. (Cl. 302—61)

This invention relates generally to forage harvesters. More particularly, the invention relates to a discharge spout control for a forage harvester.

A forage harvester, of the type to which the invention is particularly applicable, comprises generally a pick-up mechanism for delivering crop material onto an apron conveyor, feed rolls which receive material from the conveyor and deliver it to be chopped, and a cutter unit which functions to comminute the crop material and discharge it at a high velocity to a trailing wagon. The forage harvester cutter in performing the chopping function co-operates with a stationary shear bar mounted along the periphery of the housing. As the material leaves the cutter, it enters a vertically and rearwardly extending discharge spout, having an upper portion which is pivotally and adjustably mounted so that crop material can be directed to a plurality of points in a trailing wagon.

One means which has been employed for adjustably positioning the discharge spout is a worm gear arrangement comprising a worm ring mounted on the discharge spout, a worm mounted generally tangential to the worm on the spout support, and a rod or other means for driving the worm which extends forwardly to a position on the forage harvester where it can be reached by the operator. The main disadvantage in a worm gear adjusting means is that it is relatively expensive. Attempts have been made to manufacture inexpensive worm gears; however, the difficulty has been in making an inexpensive gear which has the necessary wear characteristics. In one known design, a worm is formed by mounting a helical spring on a smooth shaft and fixing the spring ends to the shaft. When the spring is so mounted, the coils are movable for a limited amount in an axial direction, but the spring cannot turn on the shaft because of the fixed ends. This design, although satisfactory from the cost standpoint, has two main disadvantages. First, because of the axial movement of the spring coils, there is an undesirable cushioning effect and a considerable lag between actuation of the worm and movement of the worm ring. Second, it has been found that after some use the coils fail or become misaligned and the coil ends tend to work loose from the shaft.

Accordingly, one object of this invention is to provide a forage harvester of the character described with a novel and improved forage harvester spout control.

Another object of this invention is to provide a spout control of the character described that is efficient, simple, and inexpensive.

Another object of this invention is to provide an inexpensive and extremely durable worm gear.

A further object of this invention is to provide a novel method of making a worm to be used in a forage harvester spout control.

A still further object of this invention is to provide a novel fixture for installing a helical coil on a shaft.

Other objects of this invention will be apparent hereinafter from the specification and from the recital in the appended claims.

In the drawings:

FIG. 1 is a perspective view of the forage harvester spout control constructed according to this invention and showing the worm gear;

FIG. 2 is a plan view of the spout control and showing one of the clamping means;

FIG. 3 is a front elevational view showing the worm and worm ring;

FIG. 4 is a cross section taken on line 4—4 of FIG. 3;

FIG. 5 is a detailed view of the worm with the helical spring shown in section.

FIG. 6 is in part an elevational view and in part a sectional view of the special fixture employed in assembling the helical spring on the shaft;

FIG. 7 is a section on line 7—7 of FIG. 6;

FIG. 8 is a plan view of FIG. 6 and showing the positions of the handle and finger in dot-and-dash lines when the helical spring is in an expanded position;

FIG. 9 is a view similar to FIG. 6, but showing the helical spring in an expanded position and the worm shaft in abutment against the lower arm.

Referring now to the drawings by numerals of reference and particularly to FIGS. 1 and 2, 10 denotes a forage harvester discharge portion having a support 12 and a discharge spout 14. Carried on the discharge spout, and fixed thereto by welding or other means, is a collar or worm wheel 16. Operatively engaging the worm wheel is a worm 18 driven by shaft 20 which extends forwardly to the harvester tongue area for operation by the farmer.

A radially extending flange 22 projects from the upper portion of support 12, and a sleeve 24 extends upwardly from this flange. Discharge spout 14 is mounted over sleeve 24 with worm wheel 16 resting on flange 22. A plurality of generally vertically extending slots 25 are formed in the outer periphery of wheel 16 for engagement with worm 18. Two side clamps 26 and 27 and a rear clamp 28 serve to hold the discharge spout in position on the support 12. Rear clamp 28 is removably held on flange 22, by bolts 30 and clamps 26 and 27 have threaded studs (not shown) which are connected to flange 22. Worm 18 is journalled in a pair of bearings 32 which are bolted to a support 34 affixed to radially extending flange 22. Shaft 20 is connected to worm 18 through a conventional type universal joint 36. Worm 18 can be adjusted radially inwardly or outwardly with respect to the worm wheel 16 by loosening bolts 38 and sliding bearings 32 on support 34 within the limits of slots 40.

As best shown in FIG. 5, worm 18 is formed with two end portions 41, 42 of the same diameter and a medial portion 44 of a greater diameter. A helical groove 46 is formed in the outer periphery of medial portion 44 an a helical spring 48 is mounted therein. The radius of curvature of the groove is equal to the radius of the spring wire and the depth of the groove is substantially less than these radii. The pitch of helical spring 48 is substantially equal to the pitch of groove 46, and the inside diameter of the spring in its unexpanded condition is less than the minor or smallest diameter of groove 46. Thus, spring 48 is held in groove 46 by tension and it is further secured to the shaft by welding its ends to portion 44 (see FIG. 3).

An important feature of this invention is the method and apparatus used in making worm 18. In forming the worm, a piece of low-grade steel stock of appropriate length is selected having a circular cross section and a diameter equal to that of intermediate portion 44. The stock is first placed in a lathe where end portions 41, 42 are formed and helical groove 46 is cut in portion 44.

A special fixture 50, as shown in FIGS. 6–9, is used to mount helical spring 48 in groove 46 on the shaft portion 44. Fixture 50 comprises a vertical support 51 having upper and lower horizontal arms 53 and 55, a vertically extending hollow cylinder 52, and a cylindrical element 58 mounted on the upper end of cylinder 52. Lower arm 53 is removably attached to support 51 by screws 59. An abutment 56 on the lower portion of cylinder 52 has a hole 57 for receiving one end of spring 48. Set screw 54 serves to hold the spring in the abutment. A radially inwardly extending finger 60 on element 58 contacts the other end of spring 48. A handle 62 is provided to rotate element 58 about the axis of cylinder 52.

In mounting helical spring 48 on the shaft, cylindrical element 58 is removed from cylinder 52 of fixture 50 and spring 58 is inserted in cylinder 52 with the spring lower end in hole 57 of abutment 56. Set screw 54 is then drawn down to securely hold the lower end of spring 48. Cylindrical element 58 is then placed on cylinder 52 with finger 60 in contact with the upper end of spring 48. Handle 62 is then moved approximately 45 degrees in a clockwise direction from its solid-line position (see FIG. 8) to the position shown in dot-and-dash lines and finger 60 is correspondingly moved. The movement of finger 60 against the upper end of spring 48 applies a torsional load on the spring which results in the spring being expanded from the position shown in FIG. 7 to the position shown in FIG. 9. With spring 48 in its expanded position, the worm shaft is easily threaded into spring and into abutment with lower arm 53 on fixture 50. The torsional load is then released to seat the spring 48 in groove 46. The only remaining step in completing the worm is to weld the two ends of spring 48 to the shaft in a conventional manner.

The desired radial position of the discharge spout is determined by the position of the trailing wagon. It is, of course, understood that spout 14 terminates in a conventional substantially horizontal deflector (not shown) at its uppermost point which directs the crop material away from the forage harvester and toward the trailing wagon. The operator changes the direction of discharge by turning a handle (not shown) on the forward portion of the harvester which rotates shaft 20 and worm 18 to drive worm ring 16 on discharge spout 14.

It will be apparent from the foregoing discussion that a simple, inexpensive, and efficient discharge spout control is achieved by the disclosed invention. The worm gear arrangement provides a positive drive means and has proven to be resistant to wear and failure.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a harvesting machine, a vertical support through which forage is discharged, a spout carried on said support for pivotal adjustment about a vertical axis, a collar surrounding said spout and fixed thereto for pivotal adjustment therewith, said collar having a plurality of slots extending in a generally vertical direction and equiangularly spaced relative to each other around the collar, a worm extending tangentially relative to said collar and in operative relation thereto, means supporting said worm at axially spaced locations thereon, said worm comprising a shaft having a helical groove on its outer surface, a helical spring in said groove, said spring being in tension on said shaft to tightly hold said spring in said groove, the ends only of said spring being welded to said shaft, and means for rotating said worm gear to turn said spout and change the direction of its discharge.

2. In a harvesting machine, a recited in claim 1, wherein said shaft is formed with a pair of end portions of the same diameter and a medial portion between said end portions of a greater diameter, said shaft has a pair of shoulders at the junctions of said medial portion and said end portions, said helical groove is formed on said medial portion and extends from one of said end portions to the other end portion, and the means supporting said worm gear comprises a pair of bearings mounted on said support and contacting said shaft end portions and said shoulders to prevent axial movement of said shaft.

3. In a harvesting machine, as recited in claim 2, wherein said helical spring is formed from wire stock having a circular cross section, said grooves are arcuate and the radius of curvature of said groove is equal to the radius of said wire stock, the depth of said groove being less than said radii so that a substantial portion of said wire projects above said shaft medial portion.

4. In a harvesting machine, as recited in claim 3, wherein the pitch of said helical groove is substantially equal to the pitch of said spring in its undeformed condition, and said pitch is substantially greater than the diameter of said wire.

References Cited by the Examiner

UNITED STATES PATENTS

| | | | |
|---|---|---|---|
| 1,231,643 | 7/1917 | Parnell | 74—458 |
| 2,578,151 | 12/1951 | Ronfeldt | 74—425 |
| 2,682,176 | 6/1954 | Fagley et al. | 74—458 |

EVON C. BLUNK, *Primary Examiner.*

A. H. NIELSEN, *Assistant Examiner.*